Sept. 1, 1970  B. G. NELSON  3,526,042
MOTORCYCLE OPERATOR TRAINER
Filed Aug. 9, 1967  2 Sheets-Sheet 1

Inventor:
Bernard G. Nelson,
by Abbott Spear, Attorney

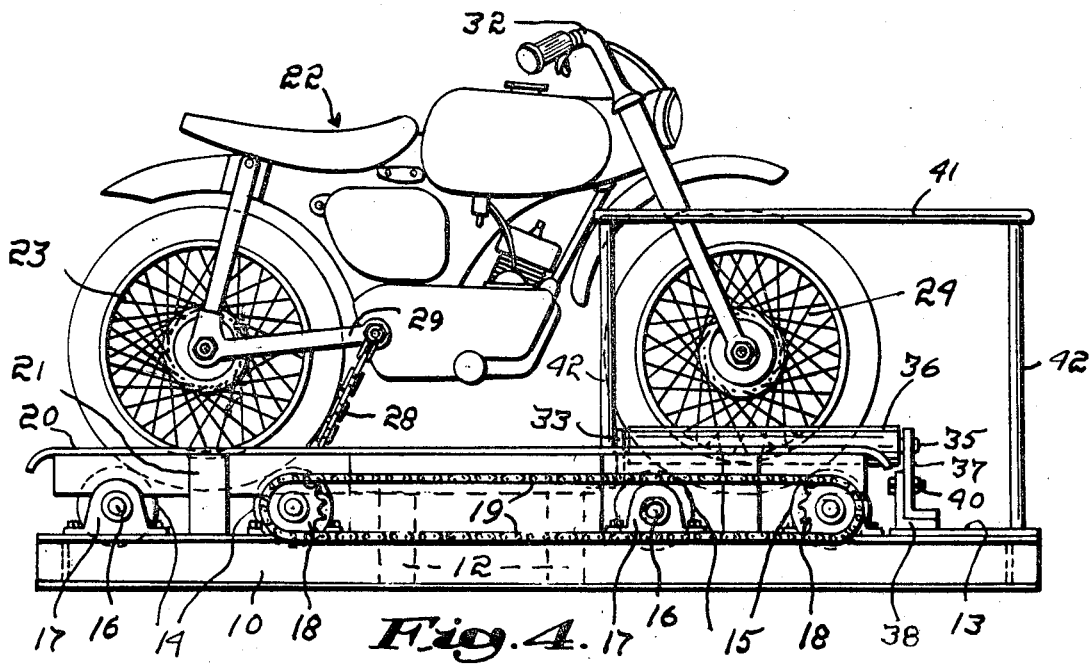
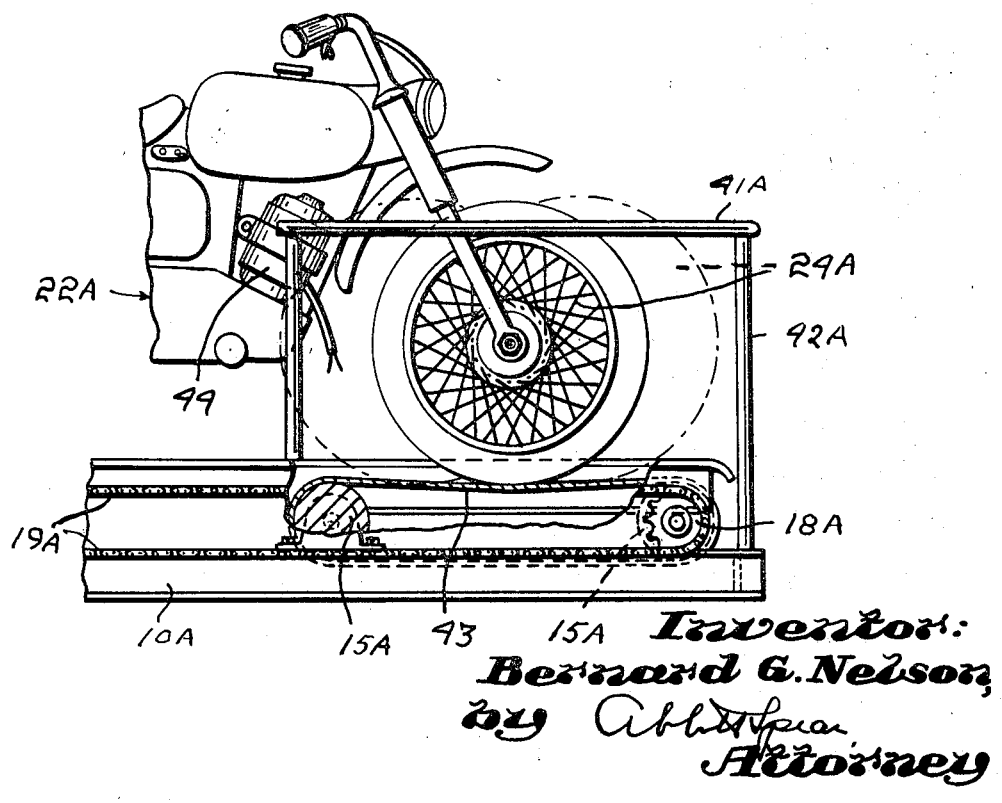

United States Patent Office 3,526,042
Patented Sept. 1, 1970

3,526,042
MOTORCYCLE OPERATOR TRAINER
Bernard G. Nelson, Rockland, Maine, assignor to Motorcycle Training Corporation, Camden, Maine, a corporation of Maine
Filed Aug. 9, 1967, Ser. No. 659,444
Int. Cl. G09b 9/04
U.S. Cl. 35—11                  7 Claims

ABSTRACT OF THE DISCLOSURE

Device for training and testing motorcycle operators and demonstrating motorcycles by simulating certain road conditions, the device having a base provided with means supporting the front and rear wheels of a motorcycle and movable by the rear wheel to drive the front wheel and with transverse stabilizing means securing the motorcycle to the device on opposite sides of the motorcycle and, optionally, with means operable to limit the steering of the motorcycle.

---

Figure 1:
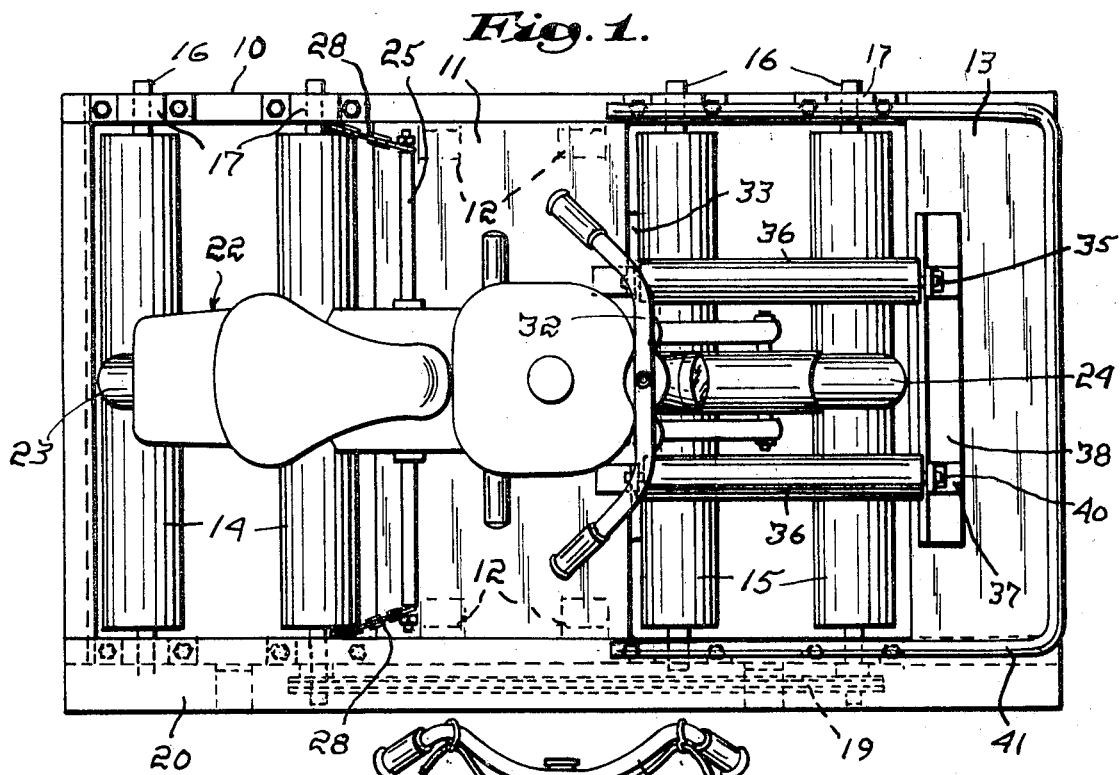

The training and testing of a motorcycle operator is made difficult by the fact that the instructor or testing officer cannot ride with him and hence it is impossible to accurately instruct or appraise his driving skills. As a consequence, motorcycle operators may be judged to be adequately trained and competent to deal with traffic problems when, in fact, they lack a thorough background in such essentials as shifting, braking, and steering.

The principal objective of the present invention is to enable motorcycle operators to be trained and tested as to fundamentals prior to a final road test. This contribution to highway safety is achieved in accordance with the invention by providing a base with means supporting the front and rear wheels of a motorcycle and movable by the rear wheel in a manner driving the front wheel and by providing transverse stabilizing means connecting the motorcycle to the base on opposite sides of the motorcycle.

Another objective of the invention is to provide supporting means in the form of two supports, one for each wheel and holding it captive, each support having a pair of parallel rolls and there being a driving connection between a roll of each pair.

Another objective of the invention is to provide stabilizing means including a transversely extending rigid stabilizer and connections with the base, the connections being either flexible or rigid.

Another objective of the invention is to provide a device in which motorcycles of different wheel bases may be held capative by the wheel supports without their adjustment relative to each other, an objective achieved by spacing the rolls of one wheel support a substantial distance apart, and connecting them by means of a belt.

A further objective of the invention is to provide the device with adjustable means that limit the extent to which the captive motorcycle may be steered.

Yet another objective of the invention is to provide a device that may be used indoors or wherever engine noise and exhaust fumes would be objectionable, an objective attained by providing a motorcycle with an electric motor as its prime mover.

In the accompanying drawings, there are shown embodiments of the invention illustrative of these and other of its objectives, novel features, and advantages.

Figure 3:
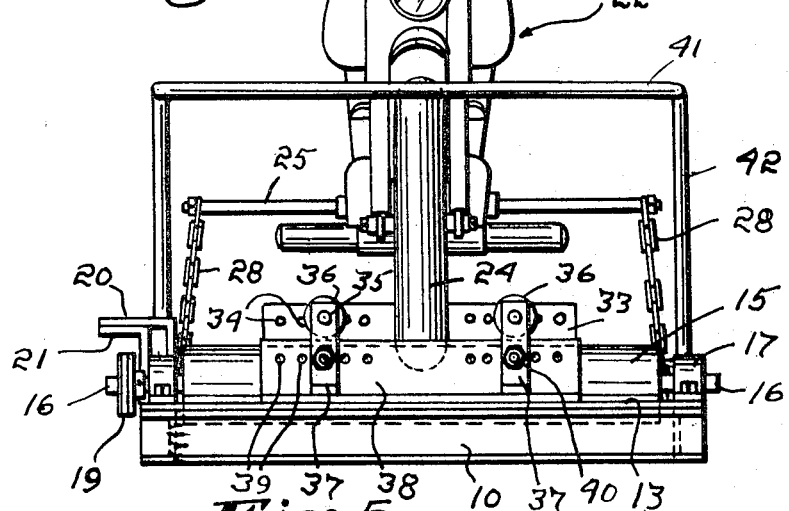
Figure 5:
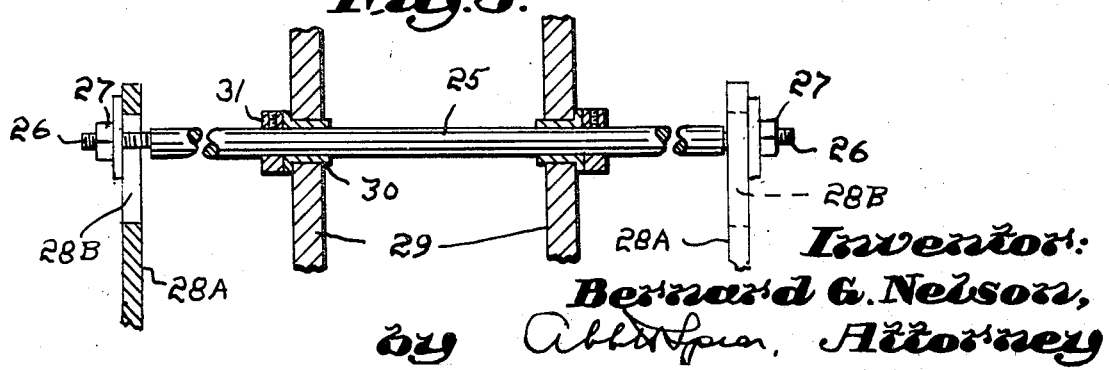

In the drawings:

FIG. 1 is a plan view of a device in accordance with the invention with a motorcycle attached, FIG. 2 is a side view showing the driving connection between the wheel supports, FIG. 3 is a front view of the device, FIG. 4 is a fragmentary side view illustrating other embodiments of the invention, and FIG. 5 is a fragmentary view showing another embodiment of the stabilizing means.

In the embodiment of the device for training and testing motorcycle operators illustrated by FIGS. 1–3, the frame 10 has a central deck 11 attached to the sides of the frame 10 by mounts 12 and a forward deck 13 secured directly to the frame 10 and spaced forwardly from the deck 11.

A pair of parallel rolls 14 is located rearwardly of the deck 11 and a pair of parallel rolls 15 are located in the space between the decks 11 and 13. Each roll has its spindles 16 journalled in bearings 17 mounted on the sides of the frame 10, and its diameter is preferably such that it protrudes slightly above the plane of the deck 11. The spindles 16 of the foremost roll of each pair at one side of the frame 10 have sprockets 18 interconnected by a chain 19. A cover 20 overlies the chain 19, the cover being shown as secured to the mounts 12 at that side of the frame 10 and as being braced at 21.

A motorcycle is generally indicated at 22 and its construction is not herein detailed except as to features important to the understanding of the invention. As will be apparent the spacing of the pairs of rolls and of the rolls of each pair is such that the rear wheel 23 is held captive by the rear pair of rolls 14 and the front wheel 24 is held captive by the front pair of rolls 15.

Stabilizing means are secured to the motorcycle and to the device. The stabilizing means are shown as a rod 25 having its ends 26 of reduced diameter, and threaded to receive nuts 27. Chains 28, one adjacent each side of the device, are anchored to the device adjacent the rear edge of the deck 11. A link of each chain 28 is caught on each rod end 26 and anchored thereto by a nut 27 to provide a convenient basis for stabilizer adjustments as will presently be explained. A common motorcycle construction includes a transverse sleeve connecting the sides of the rear assembly 29 or the rear assembly 29 may be provided with transversely aligned sleeves 30 through which the stabilizer rod 25 may be inserted with clamping rings 31 locked thereon to prevent relative movement between the motorcycle and the stabilizer rod 25.

In the embodiment of the invention illustrated by FIG. 5, the stabilizer rod 25 is shown as attached to the device by means of rigid uprights 28A instead of chains, the uprights having slots 28B through which the rod ends 26 loosely extend.

It is usually desirable, at least until the trainee has acquired a certain amount of skill, to so confine the front wheel 24 as to limit the extent to which it may be turned by the handle bars 32. For that purpose, a support 33 extends transversely of the front edge of the deck 11 and is provided with transversely spaced holes 34 to receive the end spindles 35 of a pair of rolls 36 with the other spindle ends 35 held by brackets 37 detachably clamped to a transverse support 33 on the deck 13 and having a series of transversely spaced holes 39 for the bracket anchoring bolt 40. By these or like means, the rolls 36 are rotatably mounted to confine the front wheel 24 between them with the spacing between them easily varied.

With a motorcycle on the device with its wheels held captive by the pairs of rolls and with the stabilizing means attached, the motorcycle may be operated with the rear pair of rolls 14 being driven by the rear wheel and with the front pair of rolls 15 being driven by the rear pair of rolls 14 and driving the front motorcycle wheel. The stabilizing means holds the motorcycle upright but it may be loosened, as the operator's skill increases, to permit tilting, as would occur in making turns.

While the motorcycle is securely held, a U-shaped rail 41 is secured to the front of the device by uprights 42 and this may be used to support instructions or even a screen for use in connection with film projections appropriate for driving training or testing.

While motorcycles having a different wheel base may be accommodated by varying the distance between the two pairs of rolls as by moving the front pair of rolls 15 relative thereto and increasing the length of the chain 19, the embodiment of the invention illustrated by FIG. 4 has the advantage that such changes are made unnecessary. As the device of this embodiment is generally similar to that previously described, the corresponding parts are distinguished by the suffix addition "A" to the appropriate reference numeral. In this embodiment of the invention the rolls 15A of the front pair are spaced a substantial distance apart and are interconnected by a wheel-supporting belt 43, the distance between the rolls 15A being such that wheel bases within a substantial range may be accommodated.

While the noise of a motorcycle engine and exhaust fumes are not usually problems outdoors, it is desirable to enable driver training to be conducted indoors and in places and at times where the curbing of noise is desirable. For that reason, as may be seen in FIG. 4, a motorcycle 22A may have an electric motor 44 as its prime mover.

From the foregoing, it will be apparent that devices in accordance with the invention are well adapted for use in the training of motorcycle drivers and also in the demonstration of motorcycles. It will also be apparent that the devices enable motorcycle drivers to be tested for their familiarity with the controls and their ability to operate them may be appraised by an officer or examiner before actual road tests are conducted.

I claim:

1. A device for training and testing motorcycle operators, said device comprising a base, means rotatably attached to said base for supporting the wheels of a motorcycle and permitting the front wheel thereof to be turned by the handle bar and movable by the rear wheel of a supported motorcycle as it rotates so as to rotate the front wheel, stabilizer means attachable to the supported motorcycle between its wheels and including rigid portions extending from both sides transversely of the base, and vertical means anchoring the outer end of each portion to the base adjacent the sides thereof to hold the motorcycle substantially upright but with sufficient looseness to permit the motorcycle to tilt freely to a limited extent.

2. The device of claim 1 in which the width of the supporting means permits side-to-side movement of the motorcycle and the looseness of the connection between the stabilizer portions and the base provided by the anchoring means also permits the motorcycle to move from side-to-side to a limited extent relative to the supporting means.

3. The device of claim 1 in which the anchoring means are flexible.

4. The device of claim 1 in which the anchoring means are rigid uprights and each upright has an opening through which the end of an appropriate one of the stabilizer portions freely extends.

5. The device of claim 1 and a pair of rolls overlying that portion of the supporting means that is occupied by the front wheel of a supported motorcycle and means attached to the base supporting the rolls with their axes extending in the direction in which the supporting means is movable and spaced apart to receive the front wheel between them and to limit the extent to which it may be turned by the handle bar.

6. The device of claim 5 in which the means supporting the rolls are adjustable to vary their spacing.

7. The device of claim 1 in which the supporting means comprises front and rear wheel supports, each support including a pair of rolls disposed transversely of the base, a chain drive interconnects one roll of each pair, the rear pair of rolls is spaced to hold captive the rear wheel of the supported motorcycle, and an endless member of substantial width is trained about the front pair of rolls, the front pair of rolls being spaced apart a distance such that the upper course of the endless member provides support for the front wheel of any supported motorcycle whose wheel base is within a predetrmined range.

References Cited

UNITED STATES PATENTS

| 604,200 | 5/1898 | Vogeler | 272—73 |
|---|---|---|---|
| 2,198,058 | 4/1940 | Mobeck | 272—73 |
| 2,457,430 | 12/1948 | Argyris. | |
| 2,498,047 | 2/1950 | Myers | 272—73 |
| 2,623,302 | 12/1952 | Shields | 35—22 |
| 2,805,860 | 9/1957 | Littig | 272—73 |

FOREIGN PATENTS

| 9,187 | 11/1894 | France. |
| 402,472 | 5/1966 | Switzerland. |
| 690,506 | 4/1940 | Germany. |

WILLIAM H. GRIEB, Primary Examiner